United States Patent [19]

St. John

[11] 4,294,342
[45] Oct. 13, 1981

[54] CENTRIFUGAL CLUTCH CONSTRUCTION

[75] Inventor: Richard C. St. John, North Canton, Ohio

[73] Assignee: Dyneer Corporation, Canton, Ohio

[21] Appl. No.: 118,502

[22] Filed: Feb. 4, 1980

Related U.S. Application Data

[63] Continuation-in-part of Ser. No. 928,850, Jul. 28, 1978, abandoned.

[51] Int. Cl.³ ............................................. F16D 23/10
[52] U.S. Cl. .............................................. 192/105 CD
[58] Field of Search ..................... 192/105 CD, 75, 55, 192/103 B, 107 M, 109 D

[56] References Cited

U.S. PATENT DOCUMENTS

| | | | |
|---|---|---|---|
| 1,873,561 | 8/1932 | Else et al. | 192/105 CD |
| 2,823,779 | 2/1958 | Johnson et al. | 192/105 CD |
| 3,026,665 | 3/1962 | Hoff | 192/105 CD |
| 3,283,867 | 11/1966 | Rice | 192/105 CD |
| 3,329,245 | 7/1967 | Freber | 192/105 CD |
| 3,333,662 | 8/1967 | King et al. | 192/105 CD X |
| 3,367,463 | 2/1968 | Armstrong | 192/105 CD |
| 3,693,771 | 9/1972 | DeLancey | 192/105 CD |
| 3,833,101 | 9/1974 | Pozella et al. | 192/105 CD X |

FOREIGN PATENT DOCUMENTS

| | | | |
|---|---|---|---|
| 1177479 | 12/1958 | France | 192/105 CD |
| 933615 | 8/1963 | United Kingdom | 192/105 CD |

Primary Examiner—Henry Jaudon

[57] ABSTRACT

A centrifugal clutch has a pair of clutch shoes pivotally mounted on a pivot collar for outward movement under the influence of centrifugal force to drivingly engage a concentrically mounted clutch housing. Extension springs bias the swinging ends of the clutch shoes toward retracted position. The pivot collar has a hollow cylindrical sleeve with a pair of nearly cylindrical projections mounted diagonally opposite of each other on the external surface of the sleeve. The cylindrical projections are similar to and are located parallel with each other and to the axis of the sleeve and have cylindrical circumferences greater than 180° and less than 360°. The imaginary circumferences of the outer surfaces of the projections lie in an overlapping or abutting relationship with the imaginary circumference of the outer surface of the sleeve. A discontinuous opening is formed on one end of each clutch shoe adjacent the inner edges thereof and have a shape and size complementary to the outer cylindrical surfaces of the collar projections. The collar projections are telescopically inserted within the clutch shoe openings to pivotally mount the clutch shoes on the pivot collar. The pivot collar is mounted on a drive shaft for rotation with the shaft. The clutch shoes each include a pair of similar half-shoe sections and an intervening spacer segment sandwiched therebetween. The extension springs extend between adjacent hook ends formed on the shoe spacers to bias the shoes toward retracted position.

14 Claims, 11 Drawing Figures

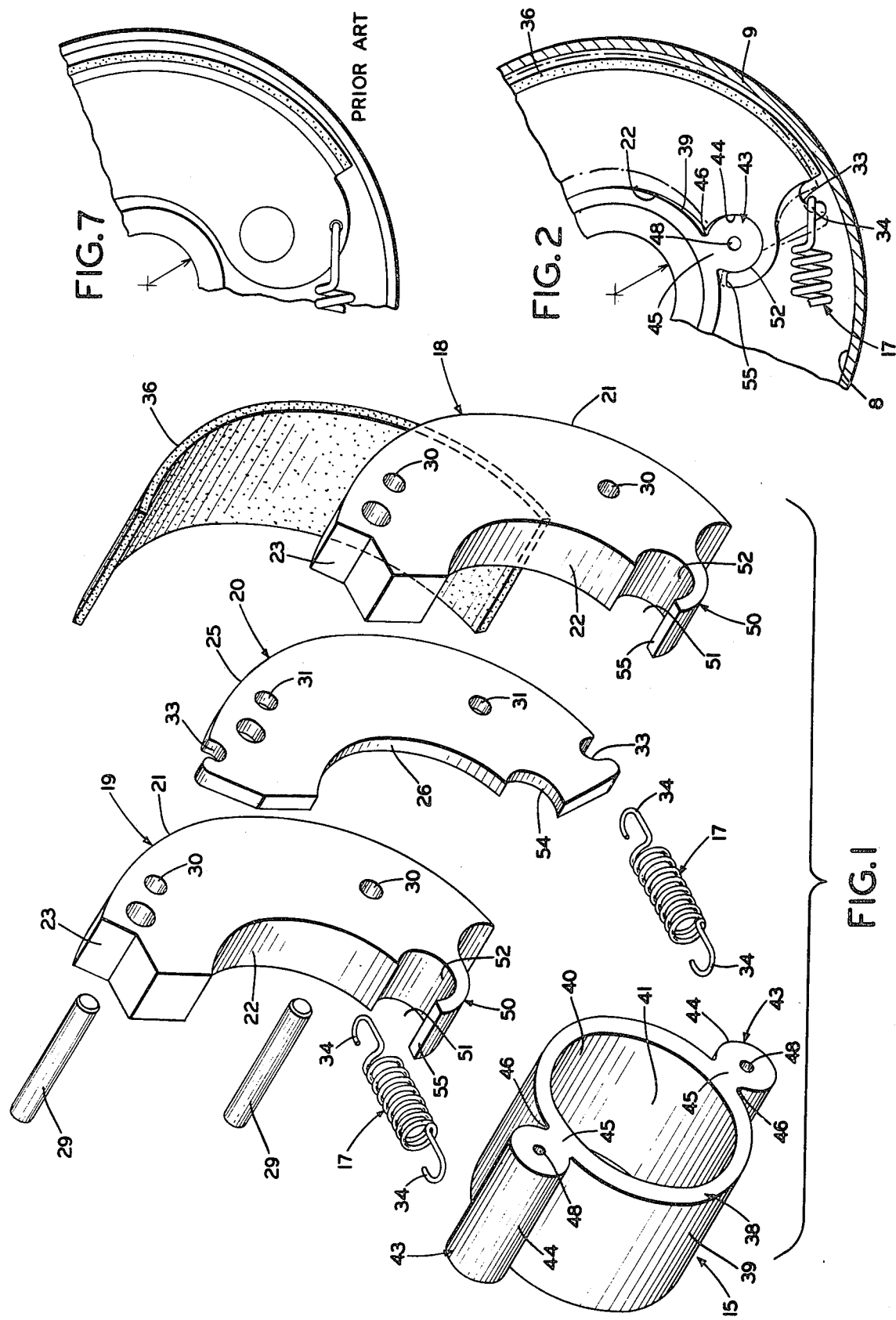

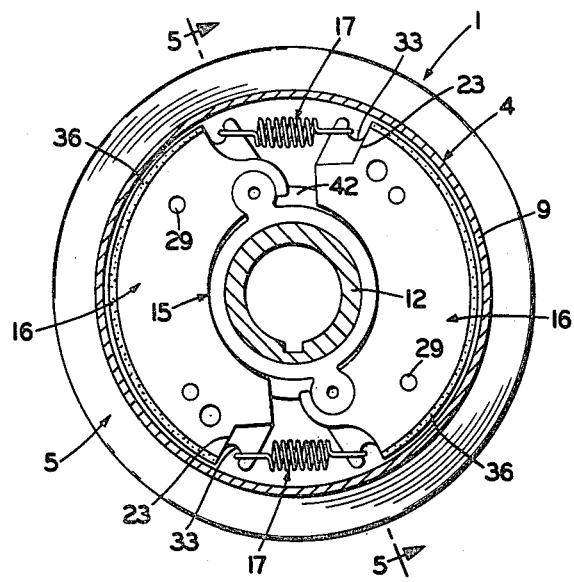
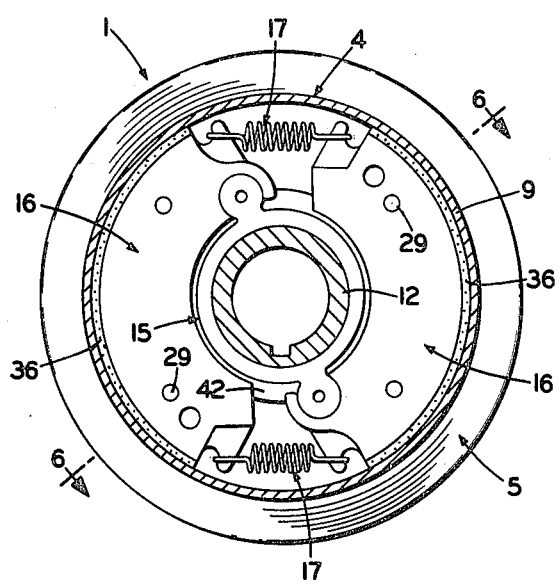
FIG.3  FIG.4
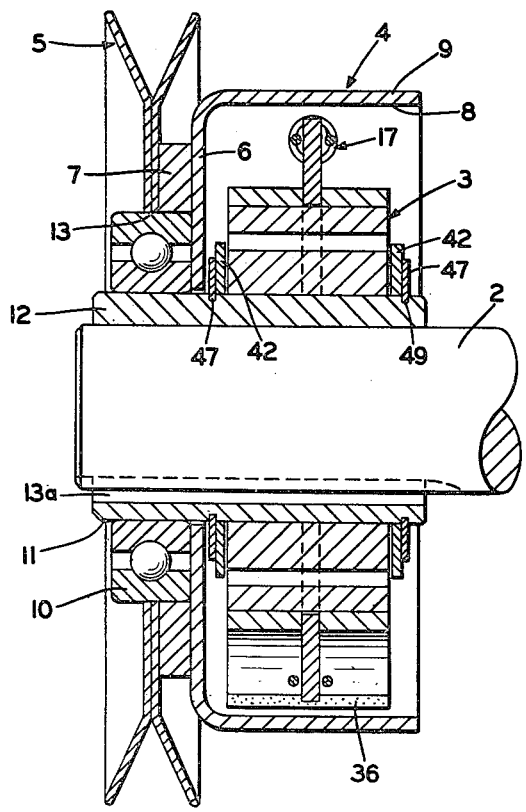
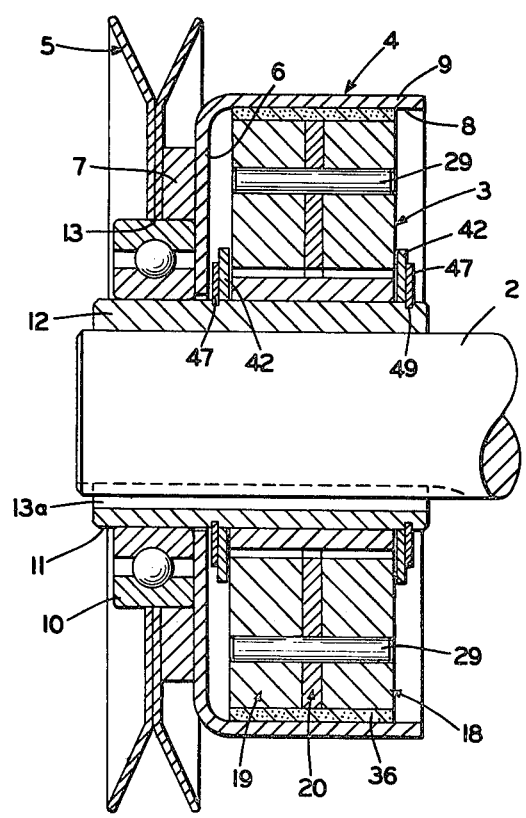
FIG.5  FIG.6

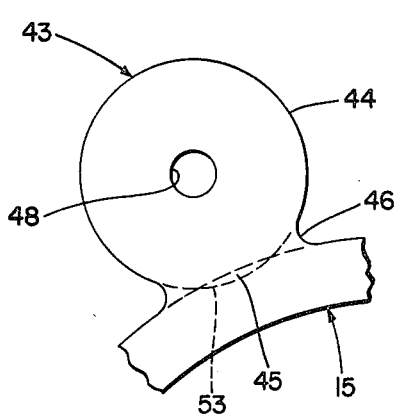
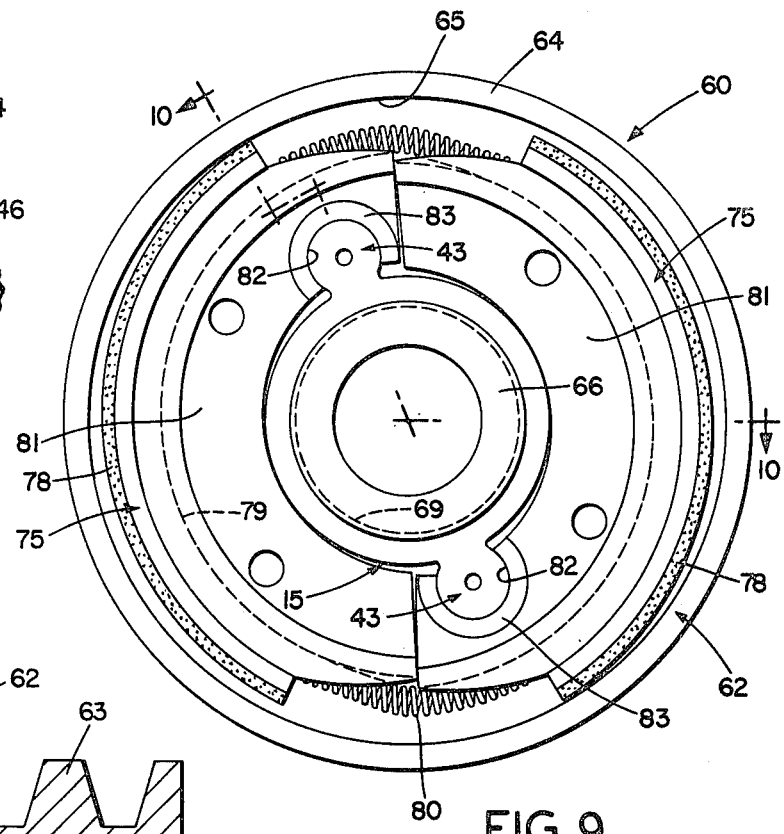
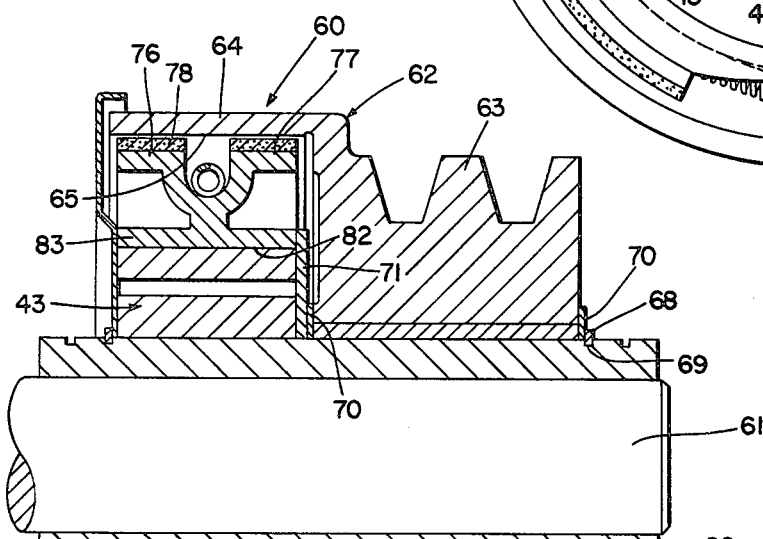
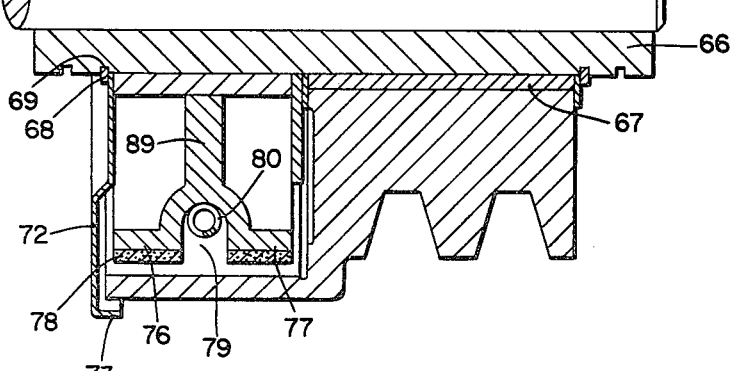
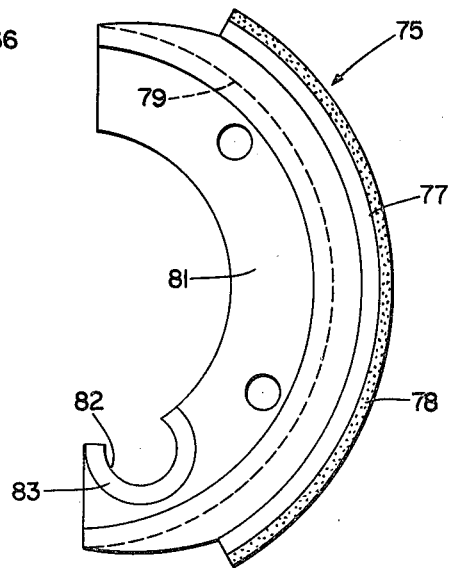
FIG.8
FIG.9
FIG.10
FIG.11

CENTRIFUGAL CLUTCH CONSTRUCTION

CROSS REFERENCE TO RELATED APPLICATION

This application is a continuation-in-part of my copending application, Ser. No. 928,850, filed July 28, 1978, now abandoned.

BACKGROUND OF THE INVENTION

1. Field of the Invention

The invention relates to clutches, and particularly, to clutches which are operated automatically by centrifugal force at a predetermined speed of rotation so as to connect a driving member or load. More particularly, the invention relates to an improved rotor assembly of a centrifugal clutch in which a pair of clutch shoes are pivotally mounted on a novel integral hub collar and pivot pin assembly.

2. Description of the Prior Art

There are numerous types and arrangements of centrifugal clutch constructions in which pivotally mounted clutch shoes are retained in retracted position by springs or other retaining means until sufficient centrifugal force acts on the shoes during rotation of the clutch rotor to overcome the retaining force of the springs. The clutch shoes then pivot and swing outwardly to drivingly engage a concentrically located clutch housing or drum.

Many of these clutch constructions have a pair of arcuate-shaped clutch shoes which are pivotally mounted on a backing plate or drive flange and arranged in an end-to-end relationship with respect to each other. The backing plate or drive flange is fixed to a drive shaft or hub for rotation with the drive shaft. These clutch shoes have various spring arrangements for biasing the shoes toward retracted position, which spring-retaining tensions are overcome by centrifugal force acting on the shoes, whereupon the clutch shoes pivot outwardly and engage the driven member.

There are many types of such centrifugal clutches which have proven satisfactory for their intended purpose. Most of these known clutches use a simple beam-type mounting arrangement for the clutch shoes, wherein a pivot pin is supported on both ends by a pair of backing plates or the like. The pins extend through a circular opening formed in and adjacent to one end of the clutch shoes for pivotally mounting the shoes. Other types of clutches use a cantilever-type mounting arrangement in which the pivot pin is supported at only one end on the backing plate. In both types of constructions, the pin projects through a circular opening in the clutch shoe. Various bushing assemblies may be telescopically mounted on the pivot pins and located within the shoe mounting openings to provide various pivot arrangements.

These clutch constructions have the disadvantage of limiting the outside diameter of the drive shaft with respect to the over-all dimensions of the clutch shoe and clutch diameter, since considerable metal mass is required for the rotor hub and clutch to provide the pivotal mounting of the clutch shoe on the rotor hub or backing plates. These constructions also require the clutch shoes to be spaced farther outward from the axis of the clutch, thereby increasing the over-all diameter of the clutch due to the extra metal required adjacent the inner arcuate edge of the shoes to form the full circular pivot pin opening with sufficient surrounding metal thickness to withstand the repeated shocks and stresses which are exerted on the clutch shoe during engagement with driven clutch member.

Other clutch constructions have clutch shoes which are mounted on pins which extend outwardly from a backing plate in which the shoes are not captured by the pins but have a pivotal sliding movement with respect thereto, as shown in U.S. Pat. Nos. 1,873,561 and 3,026,980. This type of clutch provides different operating characteristics than those clutches in which the shoes are captured by their pivot pins, since the clutch shoes move both outwardly and away from the support pin upon engaging the driven housing.

These various clutch constructions also require additional components, such as the backing plate or plates and separate pins, which must be manufactured and mounted thereon by various manufacturing methods, all of which increase the cost of the clutch, and in certain situations, present maintenance problems.

Another pertinent prior art clutch is shown in British Pat. No. 933,615 in which a pair of clutch shoes are movably mounted on cylindrical enlargements formed on the outer ends of a pair of arms which extend outwardly from the hub. This construction defeats one of the main purposes and advantages of my clutch construction, i.e., the location of the clutch shoe pivot points as close to the pivot center of the rotor as possible. The large stresses which would be created in the arms of this type clutch would require greater metal thickness to withstand such stresses, and more importantly, would increase the over-all diameter of the clutch.

Thus, the need has existed for a centrifugal clutch construction of the type in which the clutch shoes are captured by their pivot pins, preventing movement of the shoe end away from the pin without requiring the heretofore relatively large metal masses to form the pivot pin mounting opening in the clutch shoe, and also a clutch construction which enables a maximum outside diameter drive shaft to be used without increasing the over-all diameter of the clutch while still obtaining the same torque characteristics as possible with those clutches which are limited to relatively smaller diameter drive shafts.

There is no known centrifugal clutch construction of which I am aware which provides pivotally mounting the clutch shoes on an integral hub collar and pivot pin arrangement by use of a discontinuous pivot pin opening formed in each of the clutch shoes which captures the clutch shoes on their pivotal mounting pins, in which the imaginary circumferences of the outer surface of each of the mounting pins lies in an overlapping or at least an abutting relationship with the imaginary circumference of the outer surface of the hub collar, which enables a maximum outside diameter drive shaft to be used with the same size clutch shoe heretofore used to achieve the same operating torque characteristics.

SUMMARY OF THE INVENTION

Objectives of the invention include providing an improved centrifugal clutch construction having a pair of clutch shoes arranged in an end-to-end relationship with respect to each other and pivotally mounted on an improved integral hub collar and pivot pin member which eliminates the separate pivot pins and backing plate components heretofore required for the pivotal mounting of the clutch shoes; providing a clutch construction which eliminates the relatively large metal mass adjacent an end of the clutch shoe heretofore required for forming a pivot pin mounting opening in the shoe, by the use of a discontinuous pivot pin mounting opening in the shoe end having an opening forming arcuate surface greater than 180° and less than 360°, and in this mounting arrangement captures the clutch shoe on the pivot pin, preventing any movement or disengagement of the clutch shoe from the pivot pin; providing a clutch construction which enables a maximum diameter drive shaft to be used without affecting the over-all diameter of the clutch while achieving the same clutch shoe torque characteristics as in prior constructions requiring a smaller drive shaft diameter; providing such a clutch construction in which the clutch shoes are pivotally mounted on cylindrical-shaped projections, the imaginary circumference of which lies in overlapping or abutting relationship with the circumference of the hub collar; providing such a centrifugal clutch construction which is of a relatively simple arrangement, easy to manufacture and assemble, sturdy and durable in use, which eliminates difficulties encountered with other clutch constructions, which is light in weight, which achieves the objectives indicated, and which solves problems and satisfies needs existing in the art.

These objectives and advantages are obtained by the improved centrifugal clutch construction, the general nature of which may be stated as including a driven clutch member; drive shaft means; pivot collar means mounted on the drive shaft means for rotation with said shaft means, said collar means having a sleeve formed with a central bore and a pair of diametrically opposed cylindrical-shaped projection means mounted externally on the sleeve and extending along and parallel with the axis of said sleeve, with the imaginary outer circumferences of the projection means lying in abutting or overlapping relationship with respect to the imaginary outer circumference of the sleeve at the mounting location therebetween when viewed in transverse cross section; a pair of clutch shoe means, each shoe means being pivotally mounted on a respective one of the pair of projection means for pivotal movement outwardly toward and against the driven clutch member under the influence of centrifugal force from retracted to extended positions; and discontinuous opening means formed in an end of each of the clutch shoe means for receiving the projection means therein to pivotally mount the shoe means on said projection means, said opening means having a partial circular cross-sectional configuration of greater than 180° and less than 360° complementary to the cross-sectional configuration of the projection means.

BRIEF DESCRIPTION OF THE DRAWINGS

A preferred embodiment of the invention —illustrative of the best mode in which applicant has contemplated applying the principles —is set forth in the following description and shown in the drawings and is particularly and distinctly pointed out and set forth in the appended claims.

FIG. 1 is an exploded perspective view of a portion of the improved centrifugal clutch construction;

FIG. 2 is a fragmentary plan view of one of the clutch shoes shown pivotally mounted on one of the pivot collar projections;

FIG. 3 is a reduced top plan view of the improved clutch construction with the clutch housing and hub shown in section and the clutch shoes in disengaged position;

FIG. 4 is a view similar to FIG. 3 with the clutch shoes shown in engaged position;

FIG. 5 is an enlarged sectional view taken on line 5—5, FIG. 3, with the clutch shown mounted on a drive shaft;

FIG. 6 is an enlarged sectional view similar to FIG. 5 taken on line 6—6, FIG. 4, with the clutch shown mounted on a drive shaft;

FIG. 7 is a fragmentary view similar to FIG. 2 showing a prior art clutch shoe pivotal mounting arrangement;

FIG. 8 is a greatly enlarged fragmentary view showing the relationship between one of the cylindrical projections and the pivotal collar sleeve;

FIG. 9 is a top plan view of a modified clutch construction using the improved clutch shoe pivotal mounting-hub arrangement, with the end plate removed from the clutch;

FIG. 10 is a sectional view taken on line 10—10, FIG. 9; and

FIG. 11 is a plan view of one of the clutch shoes of the modified clutch construction shown in FIGS. 9 and 10.

Similar numerals refer to similar parts throughout the drawings.

DESCRIPTION OF THE PREFERRED EMBODIMENT

The improved clutch construction is indicated generally at 1, and is shown in assembled condition in FIGS. 3 and 4, and is shown mounted on a power drive shaft 2 in FIGS. 5 and 6. Clutch 1 includes a rotor assembly 3 and a driven clutch member or housing 4. Clutch 1 is shown in disengaged position in FIGS. 3 and 5, and in engaged position with housing 4 in FIGS. 4 and 6.

Housing 4 is shown as a pulley clutch housing combination having a V-groove pulley member 5 which is connected to a hub flange wall 6 of cup-shaped housing 4 by an annular spacer ring 7. The inner cylindrical surface 8 of housing wall 9 provides the coupling surface for drivingly connecting clutch housing 4 with rotor assembly 3. Housing 4 and V-groove pulley 5 may have various configurations and arrangements than that shown in the drawings and may be adapted to be operatively engaged with mechanisms other than a V-groove pulley belt without departing from the concept of the invention.

A bearing ring 10 is telescopically mounted on the outer surface 11 of a cylindrical hub 12 and concentrically within a central mounting opening 13 of pulley member 5. Bearing ring 10 enables hub 12 and rotor assembly 3 which is mounted on hub 12, to rotate freely with respect to housing 4 and pulley 5 until coupling engagement is achieved between rotor assembly 3 and housing surface 8. Hub 12 is mounted on and secured to drive shaft 2 by a key-keyway arrangement 13a.

A portion of the main components of rotor assembly 3 is shown in FIG. 1 in an exploded condition. Rotor assembly 3 includes a pivot collar 15, a pair of clutch shoe assemblies 16 pivotally mounted on collar 15, and a pair of retaining springs 17. Only one of the clutch shoe assemblies 16 is shown in exploded condition in FIG. 1. Each shoe assembly 16 includes a pair of similar, preferably identical, half-shoe sections 18 and 19 with a spacer member 20 being sandwiched therebetween. Shoe sections 18 and 19 each have a generally arcuate configuration with a smooth convexly shaped outer surface 21 and a complementary concavely shaped inner surface 22. The outer swinging end of each shoe section is formed with a stepped edge 23.

Spacer 20 has an arcuate configuration similar in size and shape to shoe sections 18 and 19. Spacer 20 includes a convex outer surface 25 and a concave inner surface 26 which are in axial alignment with outer convex surfaces 21 and inner concave surfaces 22, respectively, of shoe sections 18 and 19 when spacer 20 is mounted therebetween. Shoe sections 18 and 19 and spacer 20 are joined together by a pair of pins 29 or other fastening means which extend through aligned holes 30 and 31 formed in shoe sections 18 and 19 and spacer 20, respectively.

The ends of outer convex surfaces 25 of spacers 20 are formed with U-shaped recesses 33 into which hook-shaped ends 34 of retaining springs 17 are located when the clutch is in assembled position to bias show assemblies 16 toward retracted position. The outer ends of spacer 20, including U-shaped recesses 33 are exposed beyond the ends of shoe sections 18 and 19 (FIG. 2) due to stepped edges 23 of the shoe sections to enable springs 17 to be mounted thereon.

An arcuate-shaped strip of friction material 36 is mounted on and extends between the outer convex surfaces 21 and 25 of shoe sections 18 and 19 and spacer 20 to provide a coupling surface which engages inner drum wall surface 8 for coupling engagement between drive rotor assembly 3 and housing 4. Friction material 36 may be attached by an adhesive or other fastening means.

In accordance with the invention, pivot collar 15 includes a sleeve 38 having a cylindrical outer surface 39 and a concentric cylindrical inner surface 40 which forms an interior bore 41. A pair of generally cylindrical projections 43 are mounted diagonally opposite of each other on outer surface 39 of sleeve 38 and extend axially therealong, with the longitudinal axes of projections 43 being parallel to each other and to the longitudinal axis of sleeve 38. Projections 43 preferably are formed integral with sleeve 38 by sintering, casting, machining or similar procedures. If desired, projections 43 may be separate components which are attached to sleeve 38 by welding, brazing, etc.

Projections 43 preferably are identical to each other and include a nearly cylindrical outer surface 44 which has a circumferential length greater than 180° and less than 360°, preferably in the vicinity of 270° (FIG. 2). Projections 43 are connected to outer sleeve surface 39 by a connecting base 45. Base 45 has a pair of straight side walls 46, which extend generally radially with respect to the axis of collar 15 and extend between and axially along outer sleeve surface 39 and projection surfaces 44. Projections 43 may be formed with a central opening 48 which reduces the weight of the collar without sacrificing strength.

In further accordance with one of the main features of the invention, the imaginary circumference of outer surface 44 of each projection 43 lies in an overlapping or at least an abutting relationship with the imaginary circumference of outer surface 39 of sleeve 38 at the mounting location between projections 43 and sleeve 38, as shown by dot-dash lines 53 in FIG. 8. It is this particular arrangement which enables the pivot point for clutch shoes 16 to be positioned as close as possible to the center of rotor hub 12 or collar sleeve 38 without sacrificing strength. Furthermore, this relationship enables rotor hub 12 to have a maximum internal diameter by reducing the amount of metal mass heretofore required in prior clutch constructions for the pivotal mounting of the clutch shoes thereon without creating excess stress factors on the pivot means formed by the projection means. This clutch shoe mounting arrangement provides increased strength and enhances self-energization for the clutch by moving the clutch shoe pivot points as close to the center of the rotor as possible, while simultaneously providing for the use of a maximum diameter rotor drive shaft.

Collar 15 is telescopically mounted on hub 12 within cup wall 9 of housing 4 with a force fit so as to rotate with hub 12. Collar 15 is located between a pair of side plates 42 which have an annular configuration. Side plates 42 are held in position by a pair of snap rings 47 which are located within a pair of circumferential grooves 49 formed in and extending about surface 11 of hub 12 (FIGS. 5 and 6).

A curved hook-like formation 50 is formed on one end of each shoe section 18 and 19, opposite stepped edges 23. Hook formations 50 form discontinuous openings 51 at the end of each shoe section. Openings 51 are defined by concavely shaped, generally cylindrical surfaces 52 which have radii of curvature and arcuate lengths complementary to outer surfaces 44 of projections 43. Surfaces 52 of discontinuous openings 51 have arcuate lengths greater than 180° and less than 360° as do surfaces 44 of pivot projections 43.

A concavely shaped surface 54 also is formed in one end of spacer 20, and has a radius of curvature equal to that of discontinuous openings 51 so as to conform generally to the curvature of surfaces 52 of shoe sections 18 and 19.

In assembled condition, shoe assemblies 16 are pivotally mounted on collar 15 by telescopic engagement of sleeve projections 43 within discontinuous shoe section openings 51. Springs 17, by means of the hooked end engagements in spacer recesses 33, bias the pivotally mounted shoe assemblies 16 toward the retracted position of FIGS. 3 and 5. The concave inner surfaces 22 and 26 of shoe sections 18 and 19 and spacer segment 20 abut outer surface 39 of cylindrical sleeve 38 when in retracted unactuated position preventing any further inward pivotal movement of the shoe assemblies.

The basic operation of clutch 1 is similar to many centrifugally actuated clutch constructions. Shoe assemblies 16 attempt to pivot radially outwardly from their retracted positions of FIGS. 3 and 5 under the influence of centrifugal force as the rotational speed of shaft 2 increases. The predetermined resistance of springs 17 retains the shoes in disengaged position until shaft 2 reaches a predetermined engagement speed. When approaching the engagement speed, clutch shoe assemblies 16 move outwardly, pivoting about cylindrical projections 43 until friction material stripes 36 drivingly engage drum wall surface 8, as shown in FIGS. 4 and 6. This coupling engagement rotates housing 4 and connected V-groove pulley 5 with rotor assembly 3 to operatively drive a pulley V-belt (not shown) extending about and seated within the V-groove of pulley 5. The engagement speed of the clutch is dependent upon a number of known and determinable factors, such as the weight of shoe assemblies 16, the load of springs 17, location of pivot projections 43, etc.

Clutch shoe assemblies 16 will maintain their driving engagement with driven clutch member 4 until the speed of shaft 2 decreases to a predetermined level, whereupon the centrifugal force exerted on the shoes is overcome by the biasing force of springs 17. At the disengagement speed, springs 17 will retract the shoes from the engaged position of FIGS. 4 and 6 to the disengaged position of FIGS. 3 and 5.

In accordance with the invention, shoe assemblies 16 will pivot on collar 15 about projections 43, with projection surfaces 44 slidably engaging surfaces 52 which form the discontinuous openings 51. The particular clutch shoe mounting arrangement on projections 43 of collar 15 provides advantages not believed achieved with known prior clutch constructions. The discontinuous openings 51 of the clutch shoes and their engagement with the nearly cylindrical complementary outer surfaces of projections 43 maintain the pivotally mounted end of the clutch shoes in a captured state with respect to pivot projections 43. This captured arrangement permits only pivotal movement of the clutch shoes with respect to their mounting pin, as is achieved in a usual clutch construction which has a continuous or complete circular pivot opening formed in the clutch shoes through which circular pivot pins or bushings extend. Since the discontinuous shoe openings and complementary generally cylindrical surfaces of the pivot projections are greater than 180°, the shoes are captured by the pins and will not move away from the pivotal contact therewith. This captured state is not achieved in other clutch constructions wherein the clutch shoes pivotally and slidably move about and away from a pivot projection which is engaged within a groove formed in the clutch shoes of less than 180°.

This discontinuous opening and partial cylindrical projection mounting arrangement (shown particularly in FIG. 2) has the further advantage of enabling the clutch shoes to be mounted closer to the clutch axis or pivot collar or hub, thereby achieving a smaller outer diameter with the same size drive shaft than in prior clutch constructions. Alternatively, this arrangement enables the over-all outer diameter of the clutch to remain the same as in prior clutch constructions, while enabling a larger outer diameter drive shaft to be used. This advantage is possible since the internal diameter of collar 15, and correspondingly that of hub 12, can be increased due to the less space required to pivotally mount the shoes in a captured state. This feature is shown by a comparison of FIG. 2 with the prior art arrangement of FIG. 7.

The prior art construction of FIG. 7 also shows the additional metal that is required for pivotally mounting the clutch shoes in a captured position on the hub or backing plate. Likewise, this prior construction shows the additional components that are required for the mounting of the clutch shoes. A comparison of FIGS. 2 and 7 further shows the larger drive shaft diameter that can be used for the same diameter prior art clutch.

Another advantage and feature of improved clutch construction 1 is the use of the end edge 55 of curved hook formation 50 as a stop to prevent damage to outer metal surfaces 21 and 25 of the shoe sections and spacer upon complete wearing away of friction strip 36. End edge 55 abuts outer surface 39 of cylindrical sleeve 38, as shown in dot-dash lines FIG. 2, after a predetermined outward pivotal movement distance of the clutch shoes, which distance will correspond to the maximum amount of wear of friction strips 36.

Stop edges 55 thereby prevent any further pivotal outward movement of the shoes after a predetermined amount of wear to friction strips 36, preventing any contact of the outer metal surfaces of the shoes with housing wall surface 8. After reaching this maximum friction material wear condition, the clutch will begin to slip excessively or will not achieve coupling engagement, indicating that replacement of friction strips 36 is required.

A modified clutch assembly, indicated generally at 60, is shown in FIGS. 9–11 utilizing the unique clutch shoe-hub projection mounting arrangement described above with respect to clutch construction 1. Modified clutch 60 is shown in assembled condition in FIG. 9 and is shown in FIG. 10 mounted on a power drive shaft 61. A driven clutch member or housing 62 is shown as an integral, preferably cast metal, pulley clutch housing combination having a modified V-groove pulley member 63 integrally connected to a cup-shaped housing portion 64. The inner cylindrical surface 65 of cup-shaped housing 64 provides the coupling surface for drivingly connecting clutch housing 62 with rotor assembly 65.

Clutch housing 62 is rotatably mounted on a cylindrical hub 66 by a bearing sleeve 67. Bearing sleeve 67, housing 62 and rotor assembly 65 are maintained in position on hub 12 by a pair of spaced snap rings 68 seated within annular grooves 69 formed in the outer surface of hub 66. Bearing sleeves 67 and V-groove pulley member 63 are located between a pair of side plates 70, with pulley member 63 being spaced from rotor assembly 65 by a bearing washer 71. An end plate 72 is mounted on the other end of rotor assembly 65 by snap ring 68 and has an inturned end flange 73. Plate 72 reduces the accumulation of dirt and debris within the clutch rotor and housing assembly.

Rotor assembly 65 includes a pair of clutch shoes 75 (FIG. 11) which are generally similar in configuration to that of shoe assemblies 16, described above for clutch construction 1, except that each clutch shoe 75 is formed of an integral one-piece casting and does not have the laminated arrangement of clutch shoe assemblies 16. Each clutch shoe 75 includes a pair of convexly curved, spaced shoe table surfaces 76 and 77 (FIG. 10) having strips of friction material 78 mounted thereon. Shoe table surfaces 76 and 77 are separated by a groove 79 in which a garter spring 80 is mounted. Garter spring 80 extends about the general periphery of the clutch shoes within grooves 79 to bias the clutch shoes toward retracted position, similar to the biasing action of coil springs 17.

Shoe table surfaces 76 and 77 are formed integrally with a shoe web 81. A discontinuous opening 82 is formed in one end of each shoe web 81 by a partial tubular sleeve 83. Openings 82 are similar to discontinuous openings 51 formed in shoe assembly 16. Partial sleeves 83 pivotally mount clutch shoes 75 on projections 43 of pivot collar 15 in the same manner as described above for clutch construction 1.

The operation of modified clutch construction 60 is similar to that of clutch construction 1 with the main difference being the one-piece construction of clutch shoes 75 in contrast to the laminated construction of clutch shoe assembly 16, and the use of continuous garter spring 80 which extends annularly about rotor assembly 65 within groove 79 replacing retaining springs 17 used in clutch construction 1.

Accordingly, the improved centrifugal clutch provides a construction which is simplified, effective, safe, inexpensive, efficient, strong and durable in use, which enables larger torque characteristics to be achieved with less metal than in prior constructions, which eliminates separate backing plates, pivot pins and related components which are subject to breakage and maintenance, which enables a larger drive shaft diameter to be used with the same size clutch shoes and with the same outer clutch dimensions than in prior constructions, which achieves all the enumerated objectives, provides for eliminating difficulties encountered with prior clutch constructions and devices, and solves problems and obtains new results in the art.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction shown or described.

Having now described the features, discoveries and principles of the invention, the manner in which the improved centrifugal clutch construction is constructed, assembled and operated, the characteristics of the new construction, and the advantageous, new and useful results obtained; the new and useful structures, devices, elements, arrangements, parts, and combinations are set forth in the appended claims.

I claim:

1. An improved centrifugal clutch construction including:
   (a) a driven clutch member;
   (b) pivot collar means adapted to be mounted on a drive shaft for rotation with said drive shaft, the collar means having a cylindrical-shaped sleeve formed with a bore and a pair of diametrically opposed cylindrical-shaped projection means mounted externally on the sleeve and extending along the parallel with the axis of said sleeve, with the imaginary outer circumferences of the projection means lying in abutting or overlapping relationship with respect to the imaginary outer circumference of the sleeve at the mounting location therebetween when viewed in transverse cross section;
   (c) a pair of clutch shoe means, each shoe means being pivotally mounted on a respective one of the pair of projection means for pivotal movement outwardly toward and against the driven clutch member under the influence of centrifugal force from retracted to extended positions; and
   (d) discontinuous opening means formed in an end of each of the clutch shoe means for receiving the projection means therein to pivotally mount the shoe means on said projection means, said opening means having a partial circular cross-sectional configuration of greater than 180° and less than 360° complementary to the cross-sectional configuration of the projection means.

2. The construction defined in claim 1 in which each of the clutch shoe means includes a pair of similar arcuate-shaped clutch shoe sections and an intervening spacer member; in which the spacer members each have outer ends which extend outwardly from between the outer shoe sections; and in which spring means extend between the adjacent outer ends of the spacer members to bias the clutch shoe means toward retracted position.

3. The construction defined in claim 1 in which friction means is mounted on the clutch shoe means for coupling engagement with the driven clutch member when the shoe means are in extended position.

4. The construction defined in claim 1 in which spring means bias the clutch shoe means toward retracted position.

5. The construction defined in claim 1 in which each of the shoe means has an arcuate configuration with a convexly curved outer surface and a concavely curved inner surface joined together by first and second ends; and in which the discontinuous opening means is formed adjacent the first end.

6. The construction defined in claim 5 in which a curved hook formation extends outwardly from the first end of each clutch shoe means and inwardly toward the pivot collar means to form the discontinuous opening means.

7. The construction defined in claim 6 in which each of the hook formations terminates in an outer edge; and in which said outer edge is adapted to engage the pivot collar means to limit the extend of outward movement of the clutch shoe means.

8. The construction defined in claim 5 in which the discontinuous opening means is formed in the concavely curved inner surface of each shoe means; in which the opening means has an elongated configuration extending parallel to and spaced from the longitudinal axis of the collar means sleeve; and in which the opening means is defined by a smooth concavely shaped surface having an arcuate length of greater than 180° and less than 360°.

9. An improved rotor construction for use in a centrifugal clutch of the type having a driven clutch member and drive shaft means, said rotor construction including:
   (a) pivot collar means adapted to be mounted on the drive shaft means for rotation with said shaft means, said collar means having a sleeve formed with a central bore and a pair of diametrically opposed projection means mounted externally on and extending along an outer surface of the sleeve and parallel with the axis of said sleeve, said projection means each having a smooth convexly shaped outer surface with an arcuate length greater than 180° and less than 360°, with the imaginary circumference of the outer surface of each of the projection means lying in abutting or overlapping relationship with the imaginary circumference of the outer surface of the sleeve at the mounting location therebetween;
   (b) a pair of clutch shoe means, each being pivotally mounted on a respective one of the pair of projection means for pivotal movement outwardly toward and against the driven clutch member under the influence of centrifugal force from retracted to extended positions;
   (c) friction means mounted on the clutch shoe means to drivingly engage the driven clutch member when the shoe means are in extended position;
   (d) spring means biasing the clutch shoe means toward retracted position; and
   (e) opening means formed in and adjacent to an end of each of the clutch shoe means for telescopically receiving the projection means therein to pivotally mount the shoe means on the collar means, said opening means being defined by a smooth concavely shaped surface having an arcuate length greater than 180° and less than 360° and complementary to the outer surface of the projection means.

10. The construction defined in claim 9 in which the concavely shaped surfaces forming the opening means and the convexly shaped projection means surfaces have arcuate lengths of approximately 270°.

11. The construction defined in claim 9 in which the clutch shoe means each has an inner surface; and in which the opening means is formed in said inner surface and has a discontinuous circular cross-sectional configuration.

12. The construction defined in claim 9 in which the projection means is formed integrally with the sleeve and has a cylindrical-shaped outer portion and a connecting base portion.

13. The construction defined in claim 9 in which arcuately extending groove means is formed in each of the clutch shoe means; and in which the spring means is a continuous garter spring which is located within the groove means of the spring means and extends about the clutch shoe means.

14. The construction defined in claim 13 in which each of the clutch shoe means is an integral one-piece member having a web and an outer arcuate-shaped shoe table; and in which the groove means is formed in the shoe table of each shoe means.

* * * * *

UNITED STATES PATENT AND TRADEMARK OFFICE
CERTIFICATE OF CORRECTION

PATENT NO. : 4,294,342
DATED : October 13, 1981
INVENTOR(S) : Richard C. St. John It is certified that error appears in the above-identified patent and that said Letters Patent are hereby corrected as shown below:

Column 2, line 47, add -for- after "provides"

Column 4, line 16, change "pivotal" to -pivot-

Column 5, line 19, change "show" to -shoe-

Column 6, line 56, change "stripes" to -strips-

Column 10, line 22, change "extend" to -extent-

Signed and Sealed this

Eighth Day of December 1981

[SEAL]

Attest:

Attesting Officer

GERALD J. MOSSINGHOFF
Commissioner of Patents and Trademarks